United States Patent
Cheng et al.

(10) Patent No.: US 12,135,058 B2
(45) Date of Patent: Nov. 5, 2024

(54) RETAINER FOR LINEAR GUIDEWAY AND LINEAR GUIDEWAY USING THE SAME

(71) Applicant: HIWIN TECHNOLOGIES CORP., Taichung (TW)

(72) Inventors: Yu-Shun Cheng, Taichung (TW); Kuan-Chieh Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 97 days.

(21) Appl. No.: 18/072,901

(22) Filed: Dec. 1, 2022

(65) Prior Publication Data
US 2024/0183392 A1    Jun. 6, 2024

(51) Int. Cl.
*F16C 29/06* (2006.01)

(52) U.S. Cl.
CPC ...... *F16C 29/0607* (2013.01); *F16C 29/0642* (2013.01)

(58) Field of Classification Search
CPC .............. F16C 29/0607; F16C 29/0638; F16C 29/0642; F16C 29/0645; F16C 29/0647
See application file for complete search history.

(56) References Cited

U.S. PATENT DOCUMENTS

| | | | | |
|---|---|---|---|---|
| 4,929,095 A | * | 5/1990 | Osawa | F16C 29/0607 384/45 |
| 4,929,096 A | * | 5/1990 | Osawa | F16C 29/0647 384/45 |
| 5,308,166 A | * | 5/1994 | Osawa | F16C 29/0607 384/45 |

FOREIGN PATENT DOCUMENTS

| | | |
|---|---|---|
| DE | 3730128 A1 | 3/1988 |
| JP | H01-174282 A | 12/1989 |
| JP | 2013148157 A | 8/2013 |
| TW | I299773 B | 8/2008 |
| TW | M479994 U | 6/2014 |

* cited by examiner

*Primary Examiner* — James Pilkington
(74) *Attorney, Agent, or Firm* — MUNCY, GEISSLER, OLDS & LOWE, P.C.

(57) ABSTRACT

A retainer is used for a linear guideway, including a main body, a retaining portion, and a hollow portion. The main body extends along the longitudinal direction of the retainer. The retaining portion extends from a long side of the main body along the width direction of the retaining portion. The hollow portion is abutted between the retaining portion and the main body for allowing a part of the retaining portion to be elastically deformed when the retaining portion is compressed by an external force. Therefore, when balls are assembled, the retainer of the present invention uses the partial elastic deformation of the retaining portion to avoid damage caused by directly collided with the balls, thereby enhancing convenience of installing and removing the balls. In addition, the hollow portion can be used to save lubricating oil for achieving the effect of extended lubrication.

8 Claims, 14 Drawing Sheets

RETAINER FOR LINEAR GUIDEWAY AND LINEAR GUIDEWAY USING THE SAME

BACKGROUND OF THE INVENTION

1. Field of the Invention

The present invention relates to a linear guideway and more particularly, to a retainer for a linear guideway, and a linear guideway using the retainer.

2. Description of the Related Art

In a convention linear guideway, when balls are assembled, a retainer is directly collided with the balls so as to get damaged or deformed easily. Once a certain degree of deformation generated by the retainer has been reached, the balls do not work smoothly. At this situation, the retainer needs to be replaced, and therefore the assembly time and the parts cost are increased.

In the third embodiment of Taiwan Patent No. 1299773, two dust-preventing retainers are connected with each other. An opening is provided at the middle of the two dust-preventing retainers, and two opposite hooks are provided along the deformation direction of the opening. When the two hooks are engaged with each other, the retaining portions of the two dust-preventing retainers remain in the state of bending deformation for facilitating installing and removing the balls. In addition, Japan Patent No. 2013148157 also uses two hooks engaged with each other to install and remove the balls.

However, in the aforesaid patent documents, the operator needs to apply a certain amount of force to make the two hooks engage with each other. This causes a problem of difficult operation. Further, in the situation where the two hooks are engaged with each other, the balls located at two opposite sides are in an unrestrained state, so when the balls located at one side are installed, the balls located at the other side have a risk of falling out. Thus, there is still room for improvement in the structure of the aforesaid patent documents.

SUMMARY OF THE INVENTION

It is a primary objective of the present invention to provide a retainer for a linear guideway, which can be elastically deformed to enhance convenience of installing and removing balls provided by the linear guideway.

To attain the above objective, the retainer of the present invention comprises a main body, a retaining portion, and a hollow portion. The main body extends along the longitudinal direction. The retaining portion extends from a long side of the main body along the width direction which is perpendicular to the longitudinal direction. The hollow portion is abutted between the retaining portion and the main body. When the retaining portion is compressed, a part of the retaining portion is elastically deformed relative to the main body by means of the hollow portion.

It can be seen from the above that when the retainer of the present invention is assembled with the balls provided by the linear guideway, the retaining portion is compressed by the balls so as to be partially elastically deformed, such that the assembly space is enlarged for facilitating installation of the balls. After the balls are installed, the retaining portion will restore its original state to retain the balls for completing the assembly of the balls. In other words, the retainer of the present invention uses the partial elastic deformation of the retaining portion to avoid damage caused by directly collided with the balls, thereby enhancing convenience of installing and removing the balls. In addition, the hollow portion is used to save lubricating oil for achieving the effect of extended lubrication.

Preferably, the retaining portion extends continuously from one end of the main body to the other end of the main body along the longitudinal direction.

Preferably, two said retaining portions are provided and arranged in a symmetrical manner relative to the main body.

Preferably, the length of the retaining portion is greater than the thickness of the retaining portion. By this way, it is unnecessary for an operator to apply greater force to deform the retaining portion.

Preferably, the thickness of the retaining portion is greater than 0.5 mm and less than 6 mm. If the thickness of the retaining portion is less than 0.5 mm, the retaining portion has weak structural strength to be easily damaged. If the thickness of the retaining portion is greater than 6 mm, the operator needs to apply greater force to deform the retaining portion, causing difficulty in installing the balls.

Preferably, the retaining portion includes a first retaining part, a second retaining part, and a third retaining part. The third retaining part is located between the first retaining part and the second retaining part and abutted with the hollow portion. The retainer further has two gaps commutating with the hollow portion. The third retaining part is located between the gaps, such that when the third retaining part is compressed, the third retaining part is elastically deformed through the hollow portion and the gaps. In addition, the gaps are cooperated with the hollow portion to save lubricating oil for achieving the effect of extended lubrication.

Preferably, the retaining portion includes a first retaining part, a second retaining part, and a plurality of third retaining parts. The third retaining parts are located between the first retaining part and the second retaining part and abutted with the hollow portion. The retainer further has a plurality of gaps commutating with the hollow portion. Each of the third retaining parts is located between the two adjacent gaps, such that when one of the third retaining parts is compressed, the compressed third retaining part is elastically deformed through the hollow portion and the gaps. In addition, the gaps are cooperated with the hollow portion to save lubricating oil for achieving the effect of extended lubrication.

Preferably, the length of the third retaining part is greater than the thickness of the third retaining part, such that the operator does not apply greater force to deform the third retaining part.

Preferably, the thickness of the third retaining part is greater than 0.5 mm and less than 6 mm. If the thickness of the third retaining part is less than 0.5 mm, the third retaining part has weak structural strength to be easily damaged. If the thickness of the third retaining part is greater than 6 mm, the operator needs to apply greater force to deform the third retaining part, causing difficulty in installing the balls.

On the other hand, the present invention provides a linear guideway using the aforesaid retainer. The linear guideway comprises a rail, a slider, two end covers, a plurality of balls, and at least one aforesaid retainer. The slider is movably disposed on the rail. The two end covers are mounted to two end surfaces of the slider. The balls are disposed between the rail, the slider, and the end covers. The retainer is disposed between the rail and slider for retaining the balls.

Other advantages and features of the present invention will be fully understood by reference to the following specification in conjunction with the accompanying drawings, in which like reference signs denote like components of structure.

DETAILED DESCRIPTION OF THE INVENTION

Figure 1:
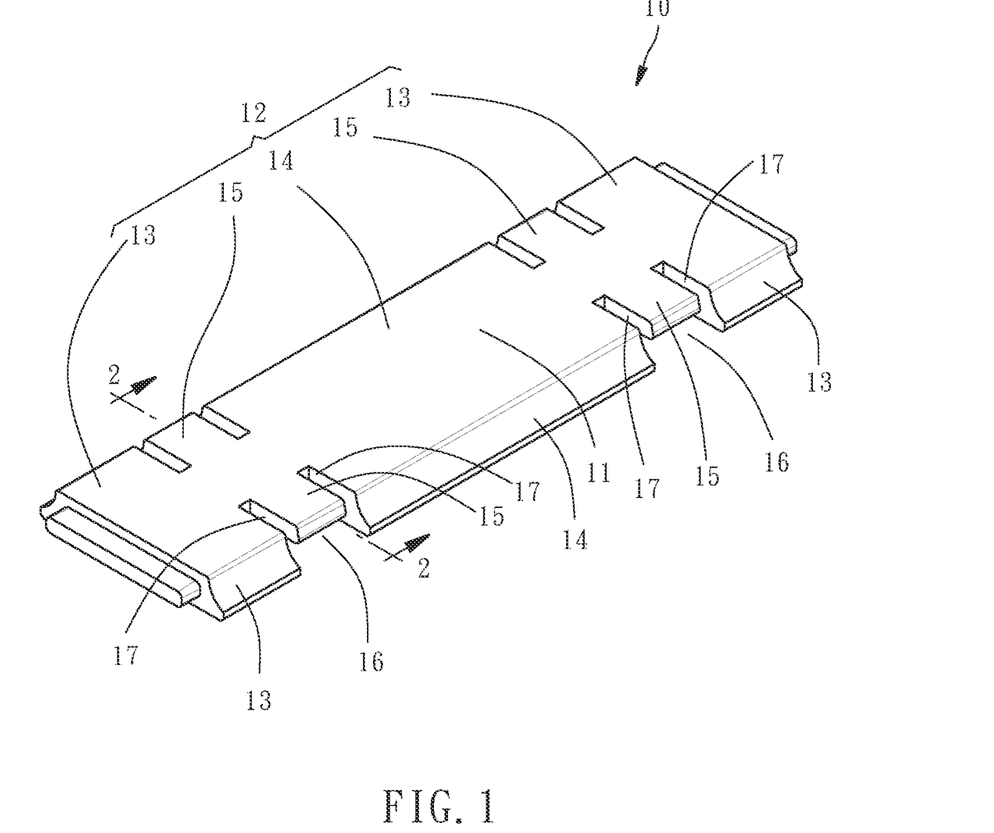
FIG. 1 is a perspective view of a retainer according to a first embodiment of the present invention.
Figure 2:
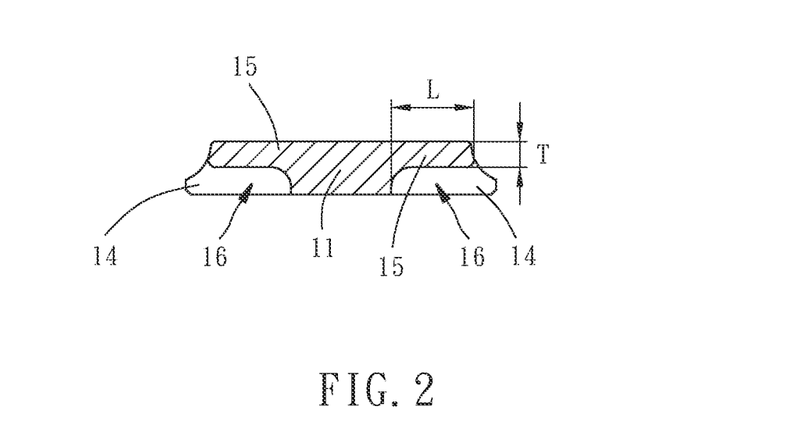
FIG. 2 is a sectional view taken along line 2-2 of FIG. 1.

Referring to FIGS. 1 and 2, a retainer 10 provided by a first embodiment of the present invention comprises a main body 11, two retaining portions 12, and four hollow portions 16. The main body 11 extends straight along the longitudinal direction of the retainer 10. The retaining portions 12 are arranged in a symmetrical manner relative to the main body 11, and the retaining portions 12 extend from two opposite long sides of the main body 11 along the width direction of the retainer 10. In this embodiment, the retaining portions 12 each have two first retaining parts 13, a second retaining part 14, and two third retaining parts 15. The third retaining part 15 is located between the first retaining part 13 and the second retaining part 14. The hollow portions 16 are abutted between the main body 11 and the third retaining parts 15 in a one-to-one manner. In addition, in this embodiment, the retainer 10 further includes eight gaps 17 arranged in pairs. Each pair of the gaps 17 are abutted with two opposite sides of the third retaining part 15 and communicates with the hollow portion 16. By this way, when the one of third retaining parts 15 is compressed by an external force, the compressed third retaining part 15 is elastically deformed relative to the main body 11 through the hollow portion 16 and the gaps 17.

Figure 3:
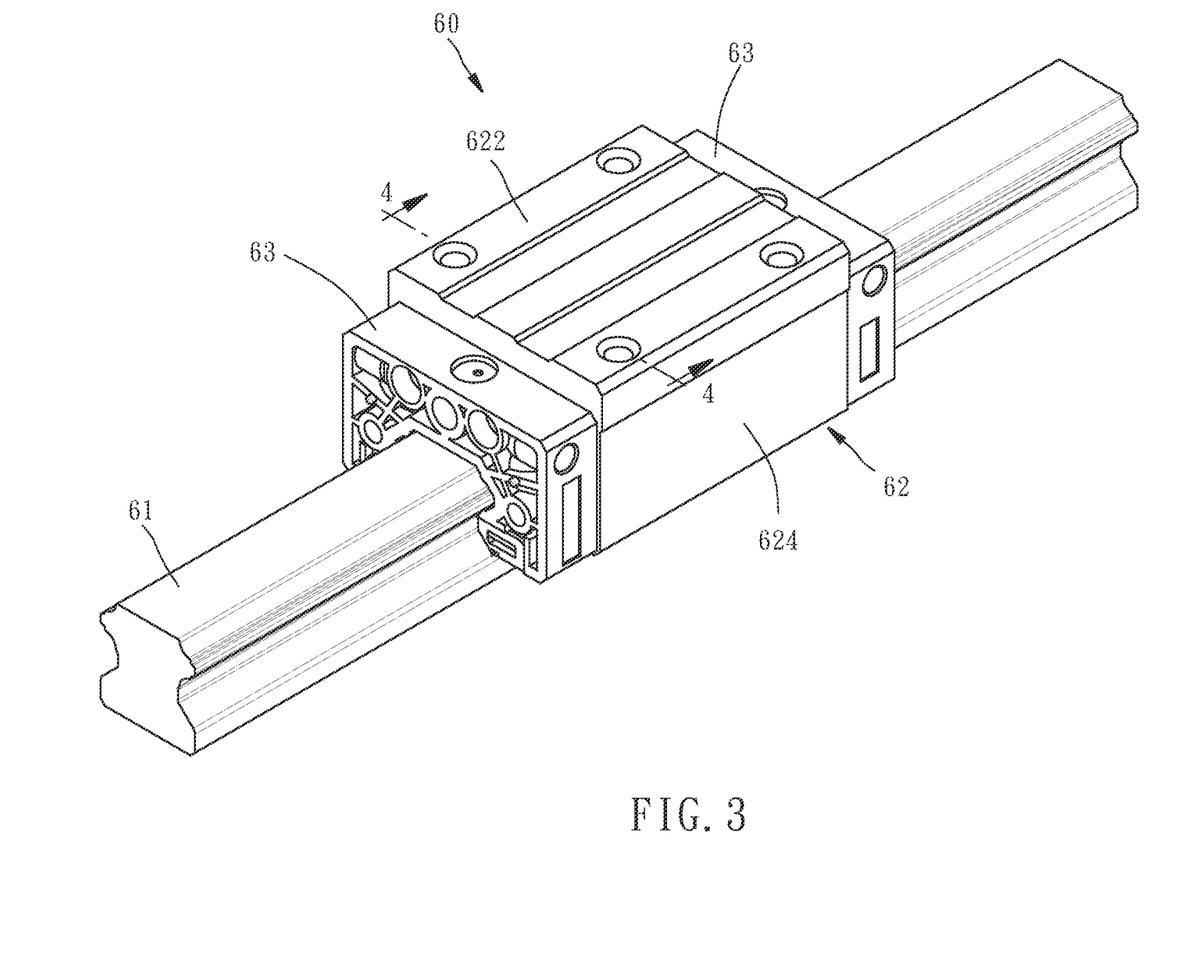
FIG. 3 is a perspective view of a linear guideway using the retainer according to the first embodiment of the present invention.
Figure 4:
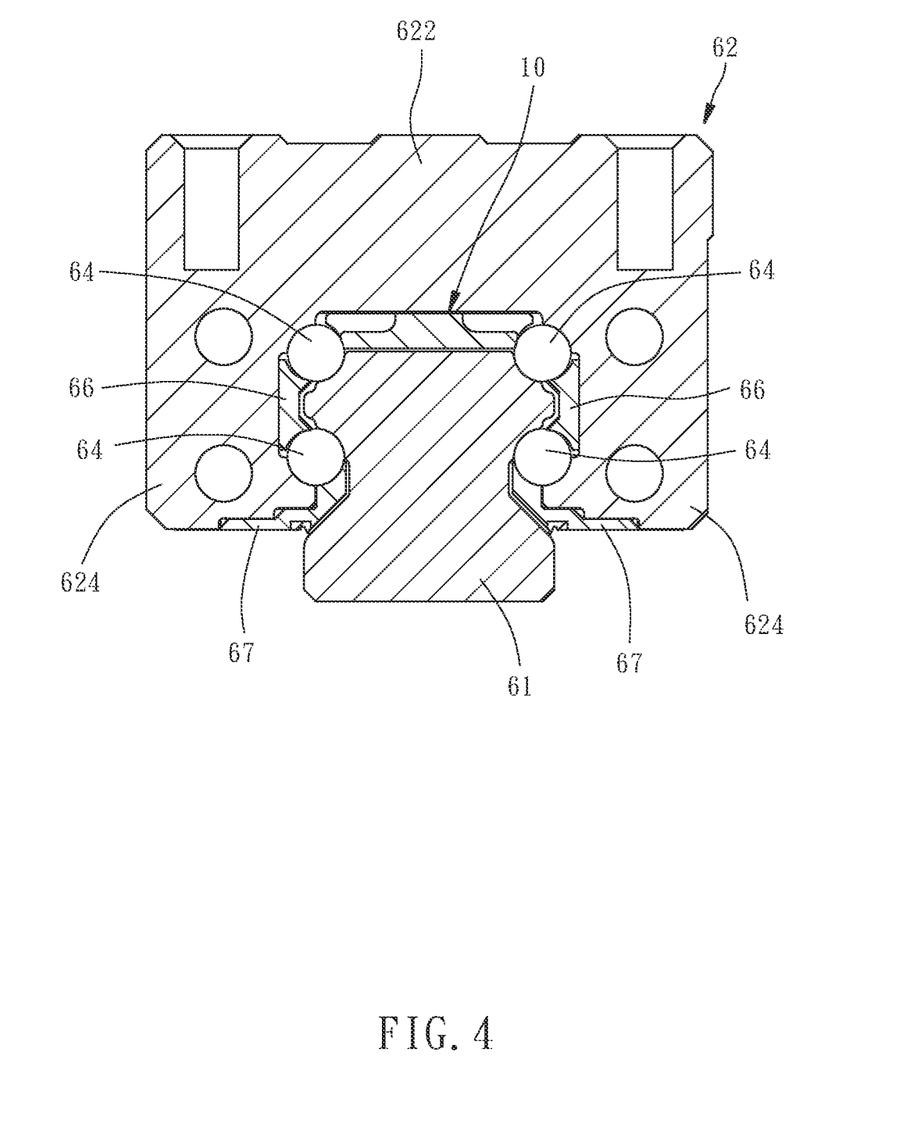
FIG. 4 is a sectional view taken along line 4-4 of FIG. 3.

Referring to FIGS. 3 and 4, a linear guideway 60 shown in FIG. 3 comprises a rail 61, a slider 62 movably disposed on the rail 61, two end covers 63 mounted to two end surfaces of the slider 62, and a plurality of balls 64 disposed between the rail 61, the slider 62, and the end covers 63, wherein the slider 62 has a flank portion 622 and two opposite lateral portions 624 connected with the flank portion 622. Because the aforesaid elements are not the key point of the present invention, the detailed configuration will not be repeatedly mentioned hereunder.

Figure 5A:
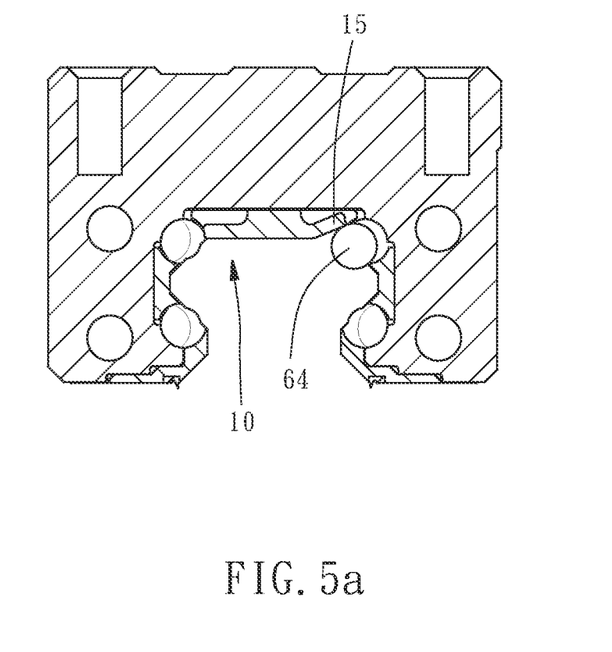
FIG. 5a is a sectional view of the retainer according to the first embodiment of the present invention, showing the third retaining part is elastically deformed by compression of the balls.
Figure 5B:
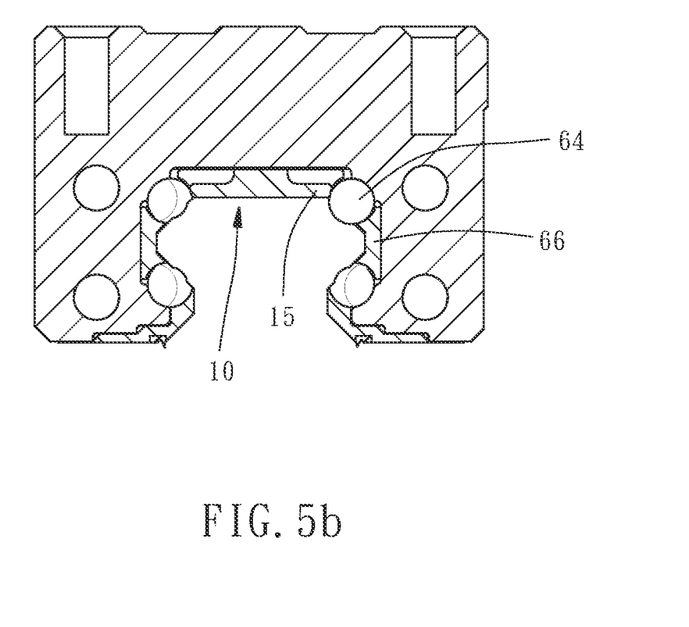
FIG. 5b is a sectional view of the retainer according to the first embodiment of the present invention, showing the upper row of the balls are retained by the third retaining part.

As shown in FIG. 4, when the retainer 10 provided by the first embodiment of the present invention is used with the linear guideway 60, two conventional middle retainers 66 and two conventional lower retainers 67 are provided for the design of the configuration of upper and lower rows of the balls 64. The retainer 10 is disposed between the rail 61 and the flank portion 622 of the slider 62. The middle retainers 66 are disposed between the rail 61 and the lateral portions 624 of the slider 62. The lower retainers 67 are disposed between the rail 61 and the lateral portions 624 of the slider 62 and located under the middle retainers 66. When the balls 64 are assembled, one of the third retaining parts 15 of the retainer 10 is elastically deformed by compression of the ball 64, as shown in FIG. 5a, such that the assembly space is enlarged for facilitating installation of the balls 64. After the balls 64 are installed, the deformed third retaining part 15 will restore its original state, as shown in FIG. 5b, for enabling the upper row of the balls 64 to be restricted between the third retaining parts 15 of the retainer 10 and the middle retainers 66, thereby completing the assembly of the balls 64. After the assembly of the balls 64 is completed, the hollow portions 16 and the gaps 17 are provided to save lubricating oil used to lubricate the balls 64 for achieving the effect of extended lubrication.

What needs to be added here is that the length L of the third retaining part 15 is greater than the thickness T of the third retaining part 15, as shown in FIG. 2. By this way, it is unnecessary for an operator to apply greater force to deform the third retaining part 15. Further, the thickness T of the third retaining part 15 is greater than 0.5 mm and less than 6 mm. If the thickness T is less than 0.5 mm, the third retaining part 15 has weak structural strength so as to be easily damaged. If the thickness T is greater than 6 mm, the operator needs to apply greater force to deform the third retaining part 15, causing difficulty in installing the balls 64.

Figure 6:
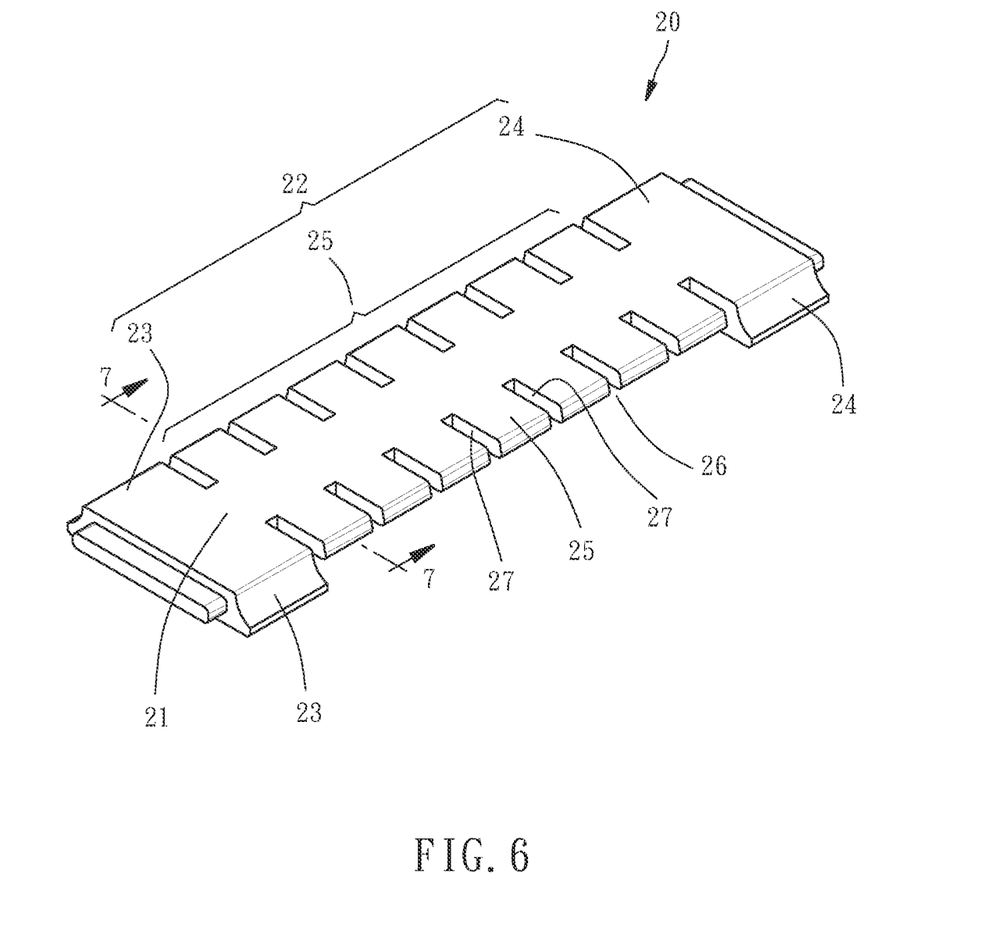
FIG. 6 is a perspective view of the retainer according to a second embodiment of the present invention.
Figure 7:
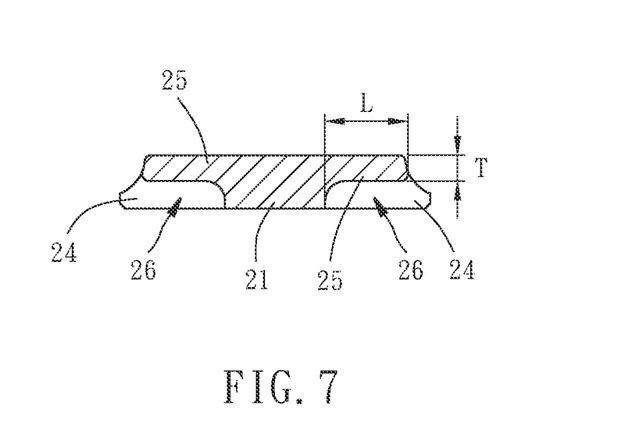
FIG. 7 is a sectional view taken along line 7-7 of FIG. 6.

As shown in FIGS. 6 and 7, a retainer 20 provided by a second embodiment of the present invention comprises a main body 21, two retaining portions 22, and two hollow portions 26. The main body 21 extends straight along the longitudinal direction of the retainer 20. The retaining portions 22 are arranged in a symmetrical manner relative to the main body 21, and the retaining portions 22 extend from two opposite long sides of the main body 21 along the width direction of the retainer 20. In this embodiment, the retaining portions 22 each have a first retaining part 23, a second retaining part 24, and a plurality of third retaining parts 25 (here, seven third retaining parts 25 are taken as an example, but they are not limited thereto). The third retaining parts 25 are located between the first retaining part 23 and the second retaining part 24. The hollow portions 26 are arranged in a symmetrical manner relative to the main body 21 and abutted between the main body 21 and the third retaining parts 25. In addition, in this embodiment, the retainer 20 further includes eight gaps 27 arranged in pairs. Each pair of the gaps 27 are abutted with two opposite sides of one of the third retaining parts 25 and communicates with the hollow portion 26. By this way, when one of the third retaining parts 25 is compressed by an external force, the compressed third retaining part 25 is elastically deformed relative to the main body 21 through the hollow portion 26 and the gaps 27. When the retainer 20 is used with the linear guideway 60 and assembled with the balls 64, the above operation of the retainer 20 provided by the second embodiment of the present invention is performed in the same way as that of the retainer 10 provided by the first embodiment of the present invention, so the detailed configuration will not be repeatedly mentioned hereunder.

What needs to be added here is that the length L of the third retaining part 25 is greater than the thickness T of the third retaining part 25, as shown in FIG. 7. By this way, it is unnecessary for the operator to apply greater force to deform the third retaining part 25. In addition, the thickness T of the third retaining part 25 is greater than 0.5 mm and less than 6 mm. If the thickness T is less than 0.5 mm, the third retaining part 25 has weak structural strength so as to be easily damaged. If the thickness T is greater than 6 mm, the operator needs to apply greater force to deform the third retaining part 25, causing difficulty in installing the balls 64.

Figure 8:
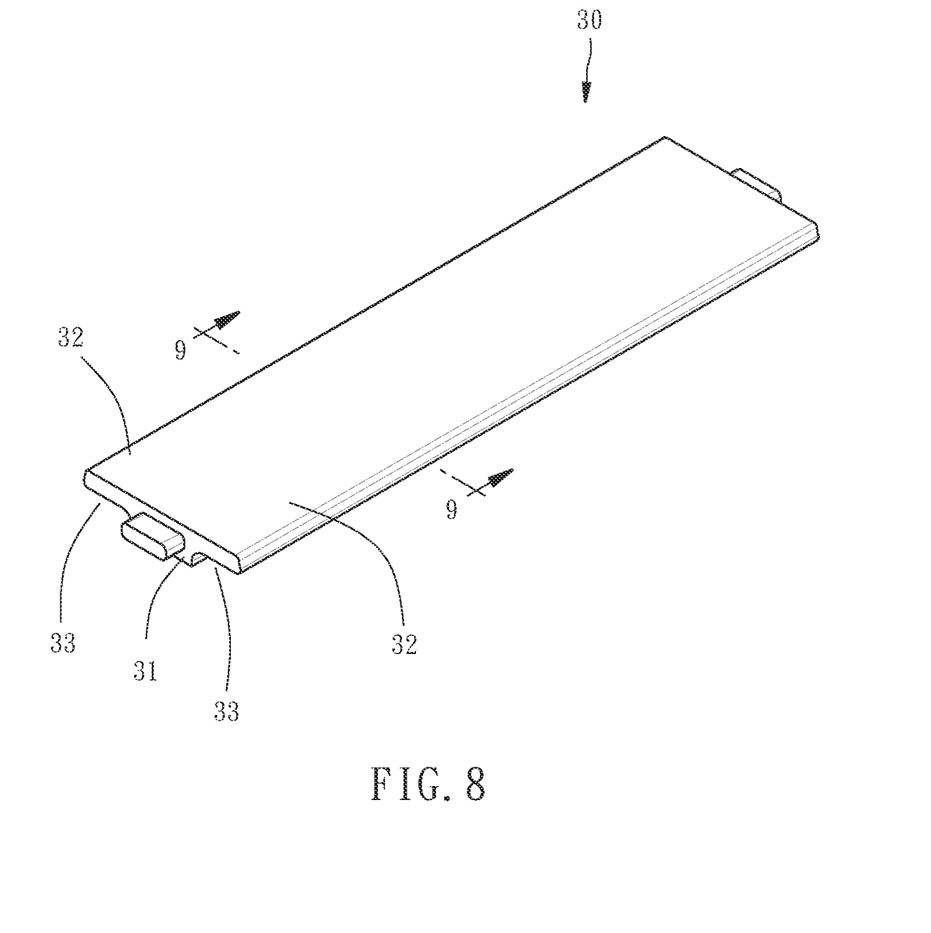
FIG. 8 is a perspective view of the retainer according to a third embodiment of the present invention.
Figure 9:
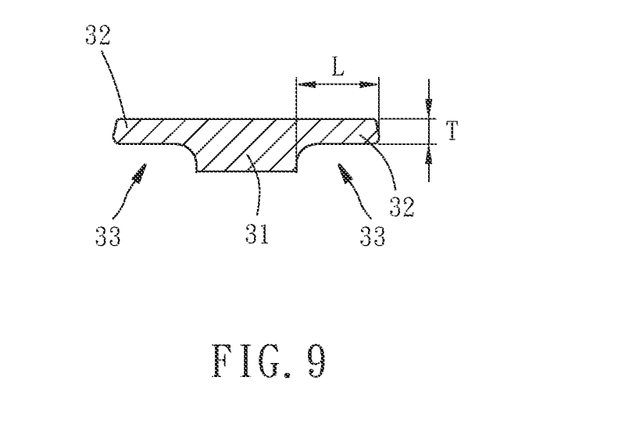
FIG. 9 is a sectional view taken along line 9-9 of FIG. 8.

As shown in FIGS. 8 and 9, a retainer 30 provided by a third embodiment of the present invention comprises a main body 31, two retaining portions 32, and two hollow portions 33. The main body 31 extends straight along the longitudinal direction of the retainer 30. The retaining portions 32 are arranged in a symmetrical manner relative to the main body 31, and the retaining portions 32 extend from two opposite long sides of the main body 31 along the width direction of the retainer 30. The hollow portions 33 are arranged in a symmetrical manner relative to the main body 31 and abutted between the main body 31 and the retaining portions 32 in a one-to-one manner. In this embodiment, the retaining portions 32 extend continuously from one end of the retainer 30 to the other end of the retainer 30 along the longitudinal direction of the retainer 30, that is to say, the gaps 17, 27 are eliminated in the retaining portions 32. By this way, when one of the retaining portions 32 is compressed by the balls 64, a part of the retaining portion 32 is elastically deformed through the hollow portion 33. When the retainer 30 is used with the linear guideway 60 and assembled with the balls 64, the operation of the retainer 30 provided by the third embodiment of the present invention is performed in the same way as that of the retainer 10 provided by the first embodiment of the present invention, so the detailed configuration will not be repeatedly mentioned hereunder.

What needs to be added here is that the length L of the retaining portion 32 is greater than the thickness T of the retaining portion 32, as shown in FIG. 9. By this way, it is unnecessary for the operator to apply greater force to deform the retaining portion 32. In addition, the thickness T of the retaining portion 32 is greater than 0.5 mm and less than 6 mm. If the thickness T is less than 0.5 mm, the retaining portion 32 has weak structural strength so as to be easily damaged. If the thickness T is greater than 6 mm, the operator needs to apply greater force to deform the retaining portion 32, causing difficulty in installing the balls 64.

Figure 10:
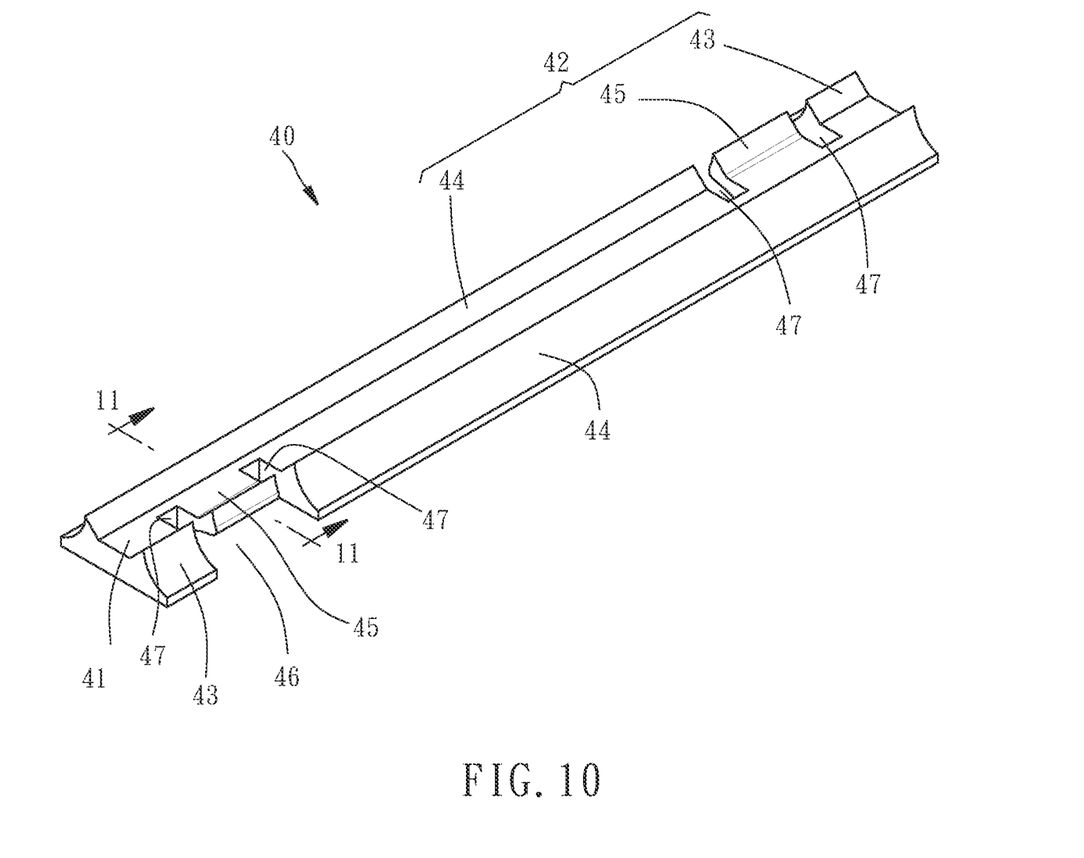
FIG. 10 is a perspective view of the retainer according to a fourth embodiment of the present invention.
Figure 11:
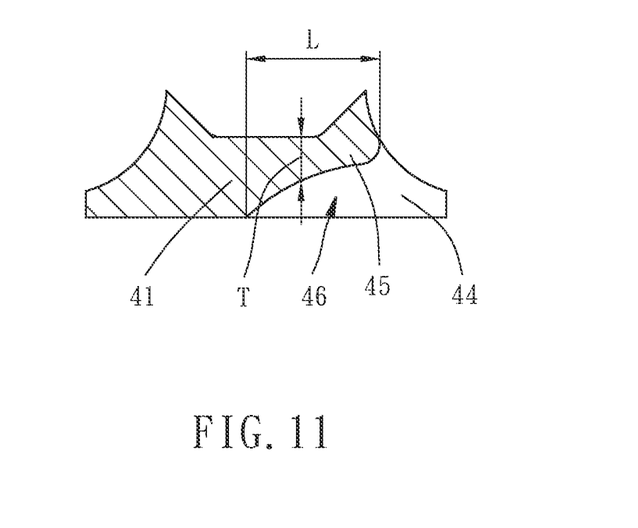
FIG. 11 is a sectional view taken along line 11-11 of FIG. 10.

As shown in FIGS. 10 and 11, a retainer 40 provided by a fourth embodiment of the present invention comprises a main body 41, two retaining portions 42, and two hollow portions 46. The main body 41 extends straight along the longitudinal direction of the retainer 40. The retaining portions 42 are located at two ends of the main body 41 and arranged in a symmetrical manner relative to the main body 41, and further, the retaining portions 42 extend from two opposite long sides of the main body 41 along the width direction of the retainer 40. In this embodiment, the retaining portions 42 each have a first retaining part 43, a second retaining part 44, and a third retaining part 45. The third retaining parts 45 is located between the first retaining part 43 and the second retaining part 44. The hollow portions 46 are abutted between the main body 41 and the third retaining parts 45 in a one-to-one manner. In addition, in this embodiment, the retainer 40 further includes four gaps 47 arranged in pairs. Each pair of the gaps 47 are abutted with two opposite sides of one of the third retaining parts 45 and communicates with one of the hollow portions 46. By this way, when one of the third retaining parts 45 is compressed by an external force, the compressed third retaining part 45 is elastically deformed relative to the main body 41 through the hollow portion 46 and the gaps 47.

Figure 12:
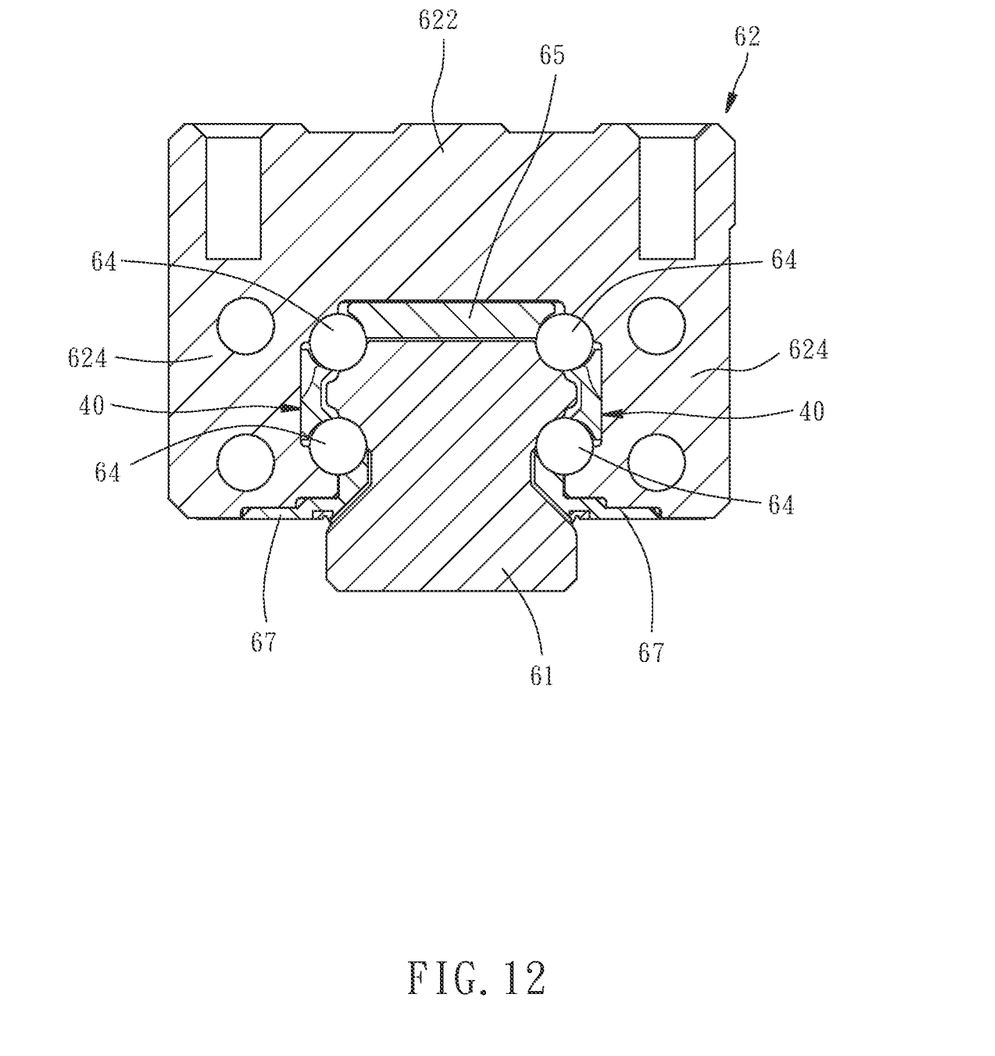
FIG. 12 is a sectional view of the linear guideway using the retainer according to the fourth embodiment of the present invention.
Figure 13A:
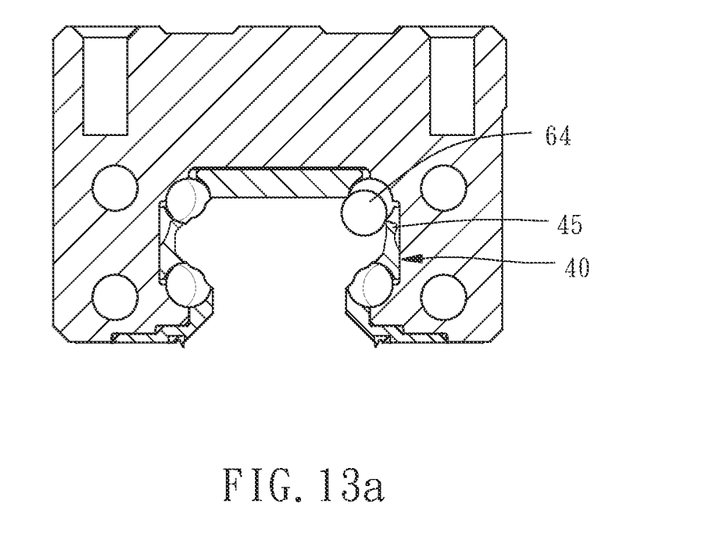
FIG. 13a is a sectional view of the retainer according to the fourth embodiment of the present invention, showing the third retaining part is elastically deformed by compression of the balls.
Figure 13B:
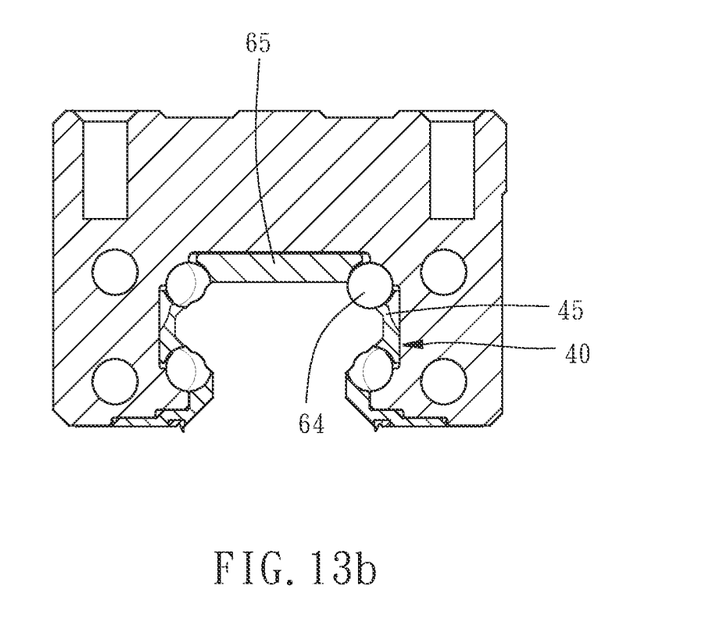
FIG. 13b is a sectional view of the retainer according to the fourth embodiment of the present invention, showing the upper row of the balls are retained by the third retaining part.
Figure 13C:
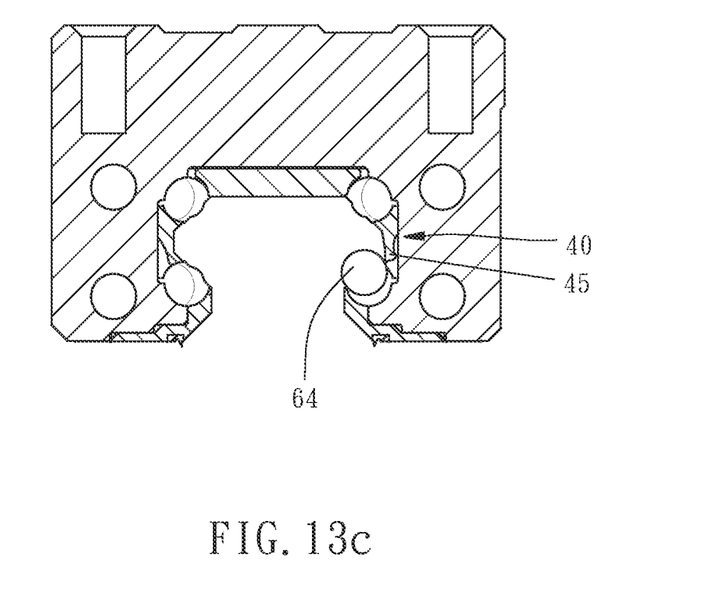
FIG. 13c is a sectional view of the retainer according to the fourth embodiment of the present invention, showing the third retaining part is elastically deformed by compression of the balls.
Figure 13D:
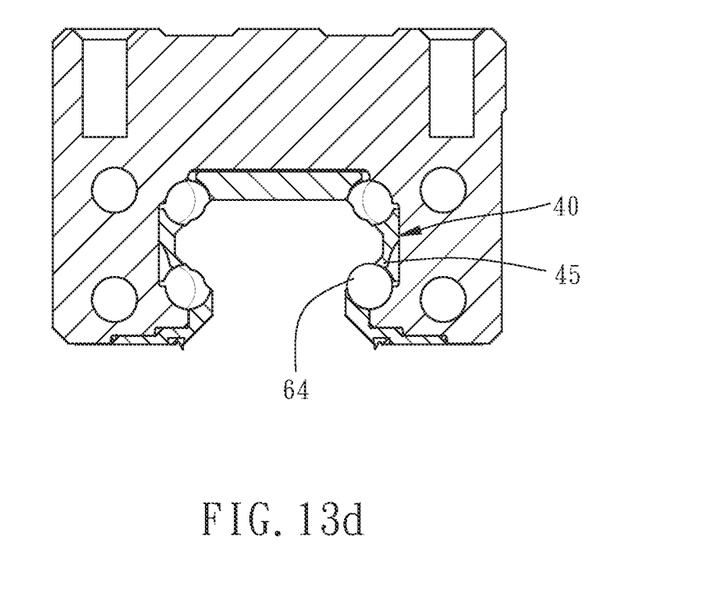
FIG. 13d is a sectional view of the retainer according to the fourth embodiment of the present invention, showing the lower row of the balls are retained by the third retaining part.

As shown in FIG. 12, when the retainer 40 provided by the four embodiment of the present invention is used with the linear guideway 60, the retainers 40 are disposed one on each side of the rail 61, and a conventional upper retainer 65 and two conventional lower retainers 67 are provided for the design of the configuration of upper and lower rows of the balls 64. The retainers 40 are disposed between the rail 61 and the lateral portions 624 of the slider 62. The upper retainer 65 is disposed between the rail 61 and the flank portion 622 of the slider 62. The lower retainers 67 are disposed between the rail 61 and the lateral portions 624 of the slider 62 and located under the retainers 40. When the balls 64 are assembled, one of the third retaining parts 45 of the retainer 40 is compressed by the ball 64 to be elastically deformed, as shown in FIGS. 13*a* and 13*c*, such that the assembly space is enlarged for facilitating installation of the balls 64. After the ball 64 are installed, the deformed third retaining part 45 will restore its original state, as shown in FIGS. 13*b* and 13*d*, such that the upper and lower rows of the balls 64 are restricted between the third retaining parts 45 of the retainer 40 and the upper retainer 65, and between the third retaining parts 45 of the retainer 40 and the lower retainers 67, respectively, thereby completing the assembly of the balls 64. After the assembly of the balls 64 is completed, the hollow portions 46 and the gaps 47 are provided to save lubricating oil used to lubricate the balls 64 for achieving the effect of extended lubrication.

What needs to be added here is that the length L of the third retaining part 45 is greater than the thickness T of the third retaining part 45, as shown in FIG. 11. By this way, it is unnecessary for the operator to apply greater force to deform the third retaining part 45. In addition, the thickness T of the third retaining part 45 is greater than 0.5 mm and less than 6 mm. If the thickness T is less than 0.5 mm, the third retaining part 45 has weak structural strength so as to be easily damaged. If the thickness T is greater than 6 mm, the operator needs to apply greater force to deform the third retaining part 45, causing difficulty in installing the balls 64.

Figure 14:
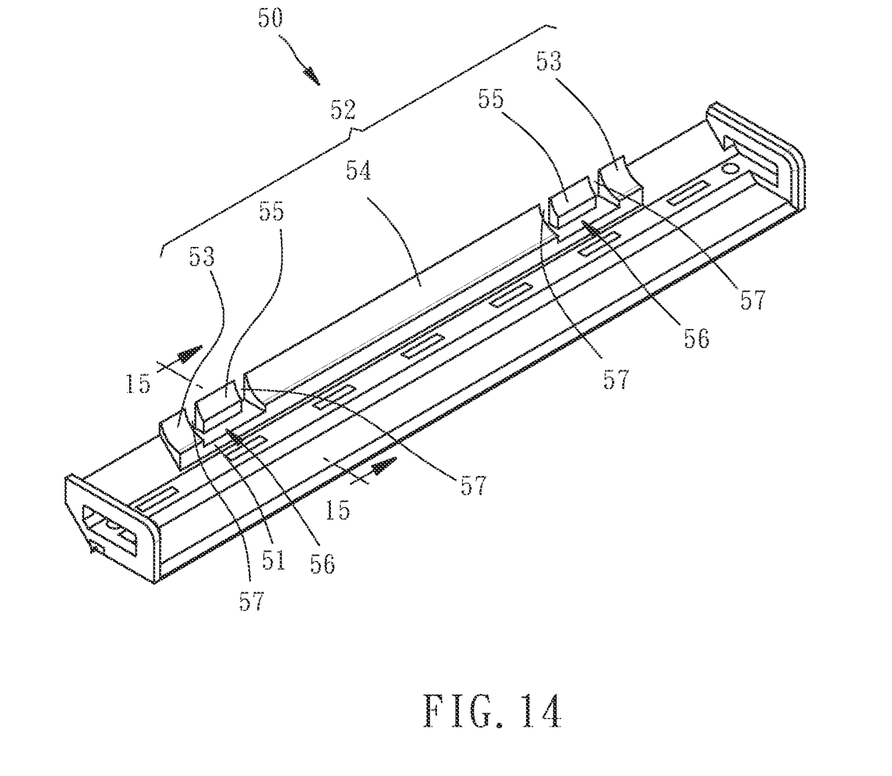
FIG. 14 is a perspective view of the retainer according to a fifth embodiment of the present invention.
Figure 15:
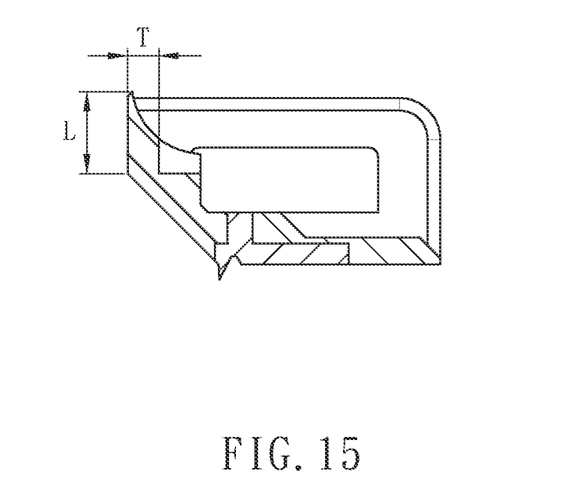
FIG. 15 is a sectional view taken along line 15-15 of FIG. 14.

As shown in FIGS. 14 and 15, a retainer 50 provided by a fifth embodiment of the present invention comprises a main body 51, a retaining portion 52, and two hollow portions 56. The main body 51 extends straight along the longitudinal direction of the retainer 50. The retaining portions 52 are located at two ends of the main body 51, and the retaining portions 52 extend from the same long side of the main body 51 along the width direction of the retainer 50. In this embodiment, the retaining portions 52 each have two first retaining parts 53, a second retaining part 54, and two third retaining parts 55. Each of the third retaining parts 55 is located between the first retaining part 53 and the second retaining part 54. The hollow portions 56 are abutted between the main body 51 and the third retaining parts 55 in a one-to-one manner. In addition, in this embodiment, the retainer 50 further includes four gaps 57 arranged in pairs. Each pair of the gaps 57 are abutted with two opposite sides of one of the third retaining parts 55 and communicates with one of the hollow portions 56. By this way, when one of the third retaining parts 55 is compressed by an external force, the compressed third retaining part 55 is elastically deformed relative to the main body 51 through the hollow portion 56 and the gaps 57.

Figure 16:
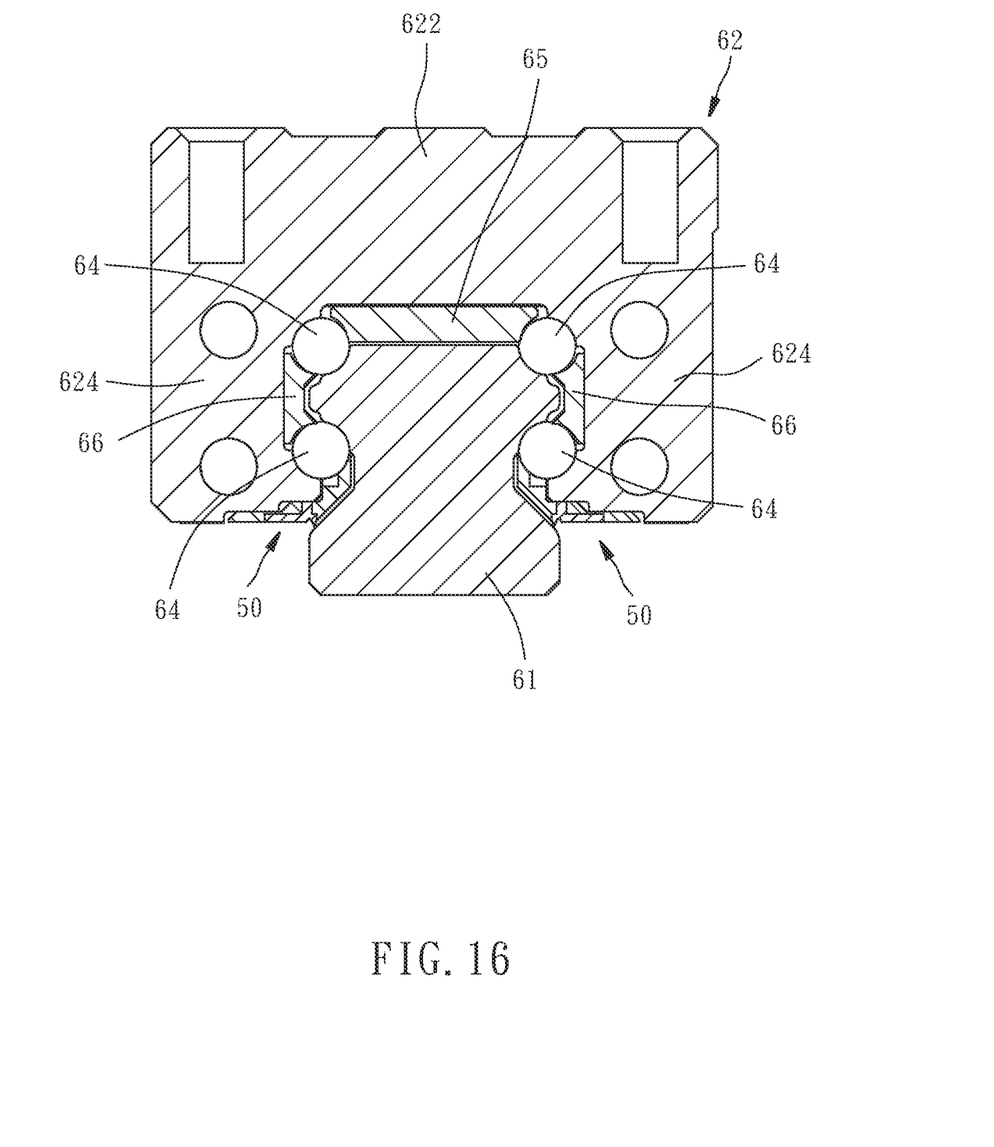
FIG. 16 is a sectional view of the linear guideway using the retainer according to the fifth embodiment of the present invention.
Figure 17A:
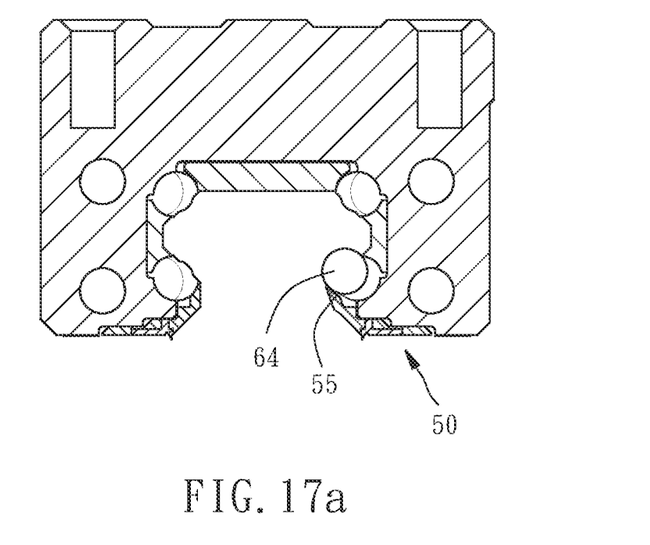
FIG. 17a is a sectional view of the retainer according to the fifth embodiment of the present invention, showing the third retaining part is elastically deformed by compression of the balls.
Figure 17B:
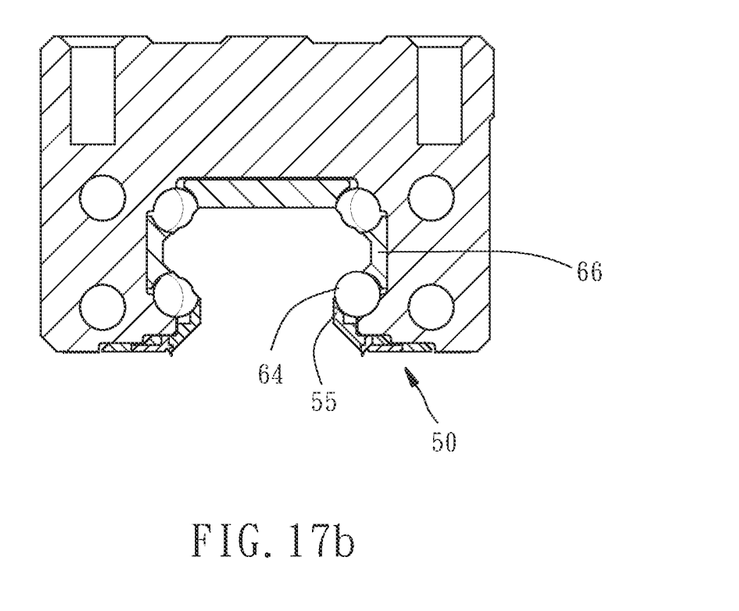
FIG. 17b is a sectional view of the retainer according to the fifth embodiment of the present invention, showing the lower row of the balls are retained by the third retaining part.

As shown in FIG. 16, when used with the linear guideway 60, the retainers 50 provided by the fifth embodiment of the present invention are disposed one on each side of the rail 61, and a conventional upper retainer 65 and two conventional middle retainers 66 are provided for the design of the configuration of upper and lower rows of the balls 64. The retainers 50 are disposed between the rail 61 and the lateral portions 624 of the slider 62. The upper retainer 65 is disposed between the rail 61 and the flank portion 622 of the slider 62. The middle retainers 66 are disposed between the rail 61 and the lateral portions 624 of the slider 62 and located above the retainers 50. When the balls 64 are assembled, one of the third retaining parts 55 of the retainer 50 is compressed by the ball 64 to be elastically deformed, as shown in FIG. 17a, such that the assembly space is enlarged for facilitating installation of the balls 64. After the balls 64 are installed, the deformed third retaining part 55 will restore its original state, as shown in FIG. 17b, such that the lower row of the balls 64 are restricted between the third retaining parts 55 of the retainer 50 and the middle retainer 66, thereby completing the assembly of the balls 64. After the assembly of the balls 64 is completed, the hollow portions 56 and the gaps 57 are provided to save lubricating oil used to lubricate the balls 64 for achieving the effect of extended lubrication.

What needs to be added here is that the length L of the third retaining part 55 is greater than the thickness T of the third retaining part 55, as shown in FIG. 15. By this way, it is unnecessary for the operator to apply greater force to deform the third retaining part 55. In addition, the thickness T of the third retaining part 55 is greater than 0.5 mm and less than 6 mm. If the thickness T is less than 0.5 mm, the third retaining part 55 has weak structural strength so as to be easily damaged. If the thickness T is greater than 6 mm, the operator needs to apply greater force to deform the third retaining part 55, causing difficulty in installing the balls 64.

Figure 18:
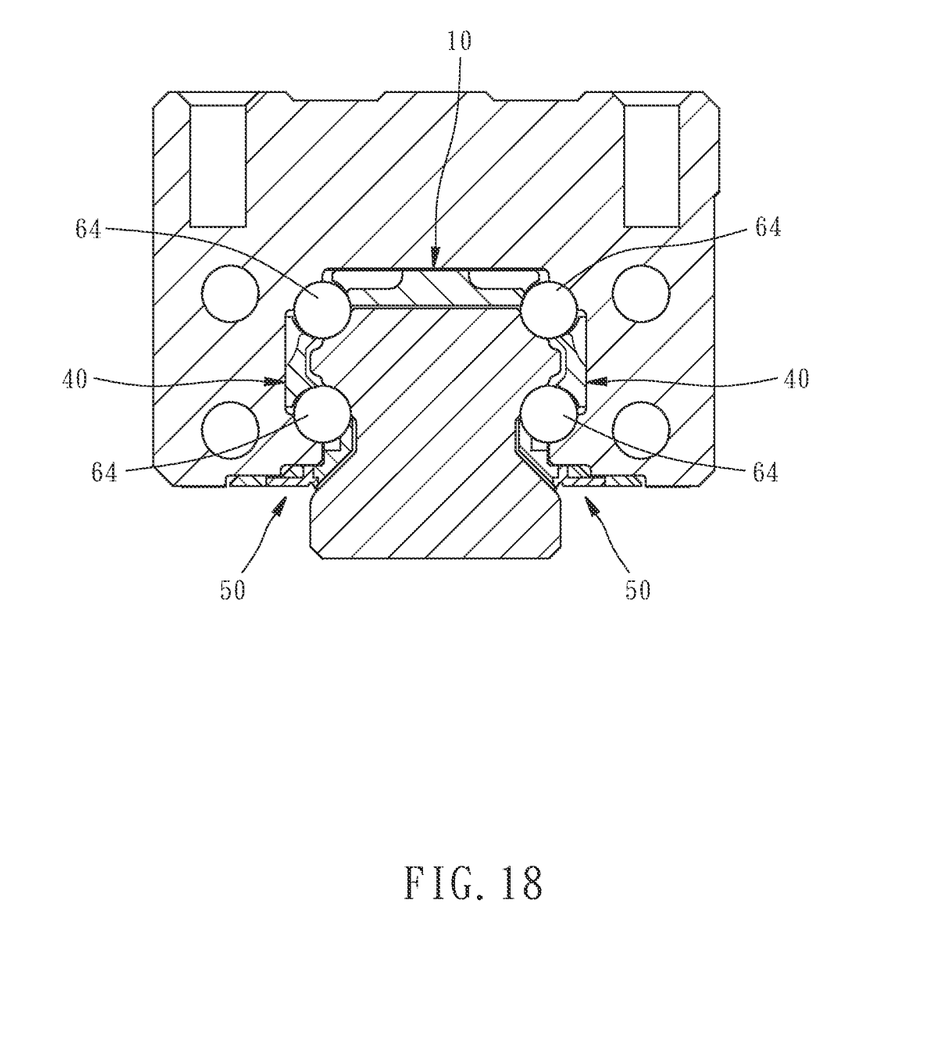
FIG. 18 is a sectional view of the linear guideway of the present invention, showing the retainer provided by the first embodiment of the present invention, the retainer provided by the fourth embodiment of the present invention, and the retainer provided by the fifth embodiment of the present invention are cooperated with each other.

To deserve to be mentioned, when used with the linear guideway 60, the retainer provided by the first embodiment, the retainer 40 provided by the fourth embodiment, and the retainer 50 provided by the fifth embodiment are not necessarily only cooperated with the conventional upper retainer 65, the conventional middle retainer 66, and the conventional lower retainer 67, that is to say, at least one of the retainers 10, 40, 50 can be cooperated with two of the conventional retainers 65, 66, 67, and preferably the retainers 10, 40, 50 can be cooperated with each other, as shown in FIG. 18, for allowing the operator to complete the assembly of the balls 64 more easily and quickly, thereby enhancing work efficiency.

As indicated above, the retainer 10, 20, 30, 40, 50 of the present invention uses the partial elastic deformation of the retaining portion 12, 22, 32, 42, 52 to avoid damage caused by directly collided with the balls 64, thereby enhancing convenience of installing and removing the balls 64. Further, the hollow portion 16, 26, 33, 46, 56 is used to save lubricating oil for achieving the effect of extended lubrication.

What is claimed is:

1. A retainer for a linear guideway, comprising a main body extending along a longitudinal direction, a retaining portion extending from a long side of the main body along a width direction which is perpendicular to the longitudinal direction, and a hollow portion formed under a part of the retaining portion, wherein when the retaining portion is compressed, the part of the retaining portion is elastically deformed relative to the main body through the hollow portion;

wherein the retaining portion includes a first retaining part, a second retaining part, and a third retaining part located between the first retaining part and the second retaining part and abutted with the hollow portion; the retainer further has two gaps commutating with the hollow portion; the third retaining part is located between the gaps, such that when the third retaining part is compressed, the third retaining part is elastically deformed through the hollow portion and the gaps.

2. The retainer as claimed in claim 1, comprising two said retaining portions arranged in a symmetrical manner relative to the main body.

3. The retainer as claimed in claim 1, wherein a length of the retaining portion is greater than a thickness of the retaining portion.

4. The retainer as claimed in claim 1, wherein a thickness of the retaining portion is greater than 0.5 mm and less than 6 mm.

5. A linear guideway comprising:
a rail;
a slider movably disposed on the rail;
two end covers mounted to two end surfaces of the slider;
a plurality of balls disposed between the rail, the slider, and the end covers; and
at least one retainer as claimed in claim 1 disposed between the rail and the slider for retaining the balls.

6. A retainer for a linear guideway, comprising a main body extending along a longitudinal direction, a retaining portion extending from a long side of the main body along a width direction which is perpendicular to the longitudinal direction, and a hollow portion formed under a part of the retaining portion, wherein when the retaining portion is compressed, the part of the retaining portion is elastically deformed relative to the main body through the hollow portion;

wherein the retaining portion includes a first retaining part, a second retaining part, and a plurality of third retaining parts located between the first retaining part and the second retaining part and abutted with the hollow portion; the retainer further has a plurality of gaps commutating with the hollow portion; each of the third retaining parts is located between two adjacent gaps of the plurality of gaps, such that when one of the third retaining parts is compressed, the compressed third retaining part is elastically deformed through the hollow portion and the gaps.

7. The retainer as claimed in claim 6, comprising two said retaining portions arranged in a symmetrical manner relative to the main body.

8. The retainer as claimed in claim 6, wherein a length of the third retaining part is greater than a thickness of the third retaining part.

\* \* \* \* \*